United States Patent
Stark et al.

(10) Patent No.: US 9,406,964 B2
(45) Date of Patent: Aug. 2, 2016

(54) FUEL CELL STACK

(71) Applicant: Daimler AG, Stuttgart (DE)

(72) Inventors: Holger Stark, Allmersbach im Tal (DE); Ulf-Michael Mex, Stuttgart (DE)

(73) Assignee: Daimler AG, Stuttgart (DE)

( * ) Notice: Subject to any disclaimer, the term of this patent is extended or adjusted under 35 U.S.C. 154(b) by 201 days.

(21) Appl. No.: 14/371,407

(22) PCT Filed: Dec. 15, 2012

(86) PCT No.: PCT/EP2012/005180
§ 371 (c)(1),
(2) Date: Jul. 9, 2014

(87) PCT Pub. No.: WO2013/104396
PCT Pub. Date: Jul. 18, 2013

(65) Prior Publication Data
US 2015/0010844 A1    Jan. 8, 2015

(30) Foreign Application Priority Data

Jan. 10, 2012   (DE) .................. 10 2012 000 264

(51) Int. Cl.
*H01M 8/24*   (2016.01)

(52) U.S. Cl.
CPC ............ *H01M 8/2475* (2013.01); *H01M 8/248* (2013.01); *Y02E 60/50* (2013.01)

(58) Field of Classification Search
CPC ............................. H01M 8/2475; H01M 8/248
See application file for complete search history.

(56) References Cited

U.S. PATENT DOCUMENTS

| | | | |
|---|---|---|---|
| 2003/0235733 A1 | 12/2003 | Haltiner, Jr. et al. | |
| 2006/0166053 A1* | 7/2006 | Badding | H01M 8/0271 429/429 |
| 2010/0092839 A1 | 4/2010 | Kaupert | |

FOREIGN PATENT DOCUMENTS

| | | |
|---|---|---|
| DE | 10 2008 051 181 A1 | 4/2010 |
| EP | 1 394 883 A1 | 3/2004 |
| JP | 8-315854 A | 11/1996 |
| JP | 2003-323902 A | 11/2003 |
| JP | 2004-335336 A | 11/2004 |
| JP | 2009-170169 A | 7/2009 |

OTHER PUBLICATIONS

Partial English Translation of Japanese Office Action issued in counterpart Japanese Application No. 2014-550644 dated Jun. 30, 2015 (Three (3) pages).
International Search Report dated Apr. 8, 2013 (Two (2) pages).
German-language Written Opinion dated Apr. 8, 2013 (Six (6) pages).

* cited by examiner

*Primary Examiner* — Stewart Fraser
(74) *Attorney, Agent, or Firm* — Crowell & Moring LLP

(57) ABSTRACT

A fuel cell stack is formed from a plurality of stacked fuel cell units and at least one stack end element. The stacked fuel cell units being surrounded by a housing. A frame element is situated on the at least one stack end element and the housing on the end-face side. At least one seal is situated at least between the stack end element and the housing in the area of the frame element.

10 Claims, 1 Drawing Sheet

FUEL CELL STACK

BACKGROUND AND SUMMARY OF THE INVENTION

Figure 1:
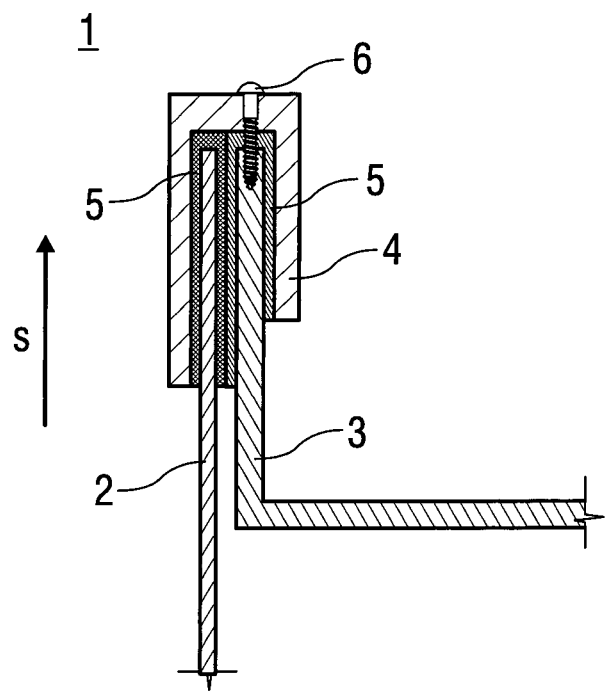

Exemplary embodiments of the invention relate to a fuel cell stack.

Fuel cell units convert chemical energy into electrical energy. A fuel cell unit is customarily composed of a membrane electrode unit having a proton-conductive membrane, and as electrodes, an anode and a cathode in the form of gas diffusion electrodes, the membrane being situated between the anode and the cathode, and the membrane electrode unit being situated between two bipolar plates, and a bipolar plate in each case being situated between two adjacent fuel cell units.

Since a voltage that can be generated by a single fuel cell unit is relatively small, multiple fuel cell units are typically coupled to one another and combined as a fuel cell stack. The stacked fuel cell units are generally situated in a housing, which is preferably situated between end plates of the fuel cell stack. In addition, in this arrangement at least one side of the end plates is accessible in such a way that a force-fit connection to a holder or support frame, such as a vehicle body, may be established. The height of a fuel cell stack having a predefined number of fuel cell units may vary due to thickness tolerances of the bipolar plates, the membrane electrode units and/or the seals, for example. The thickness deviations of the individual components vary, for example, in a range from several hundredths of a millimeter to several tenths of a millimeter. Since the individual tolerances of the components are cumulative, the height of the fuel cell stack containing several hundred fuel cell units, for example, may deviate greatly from a target height. For example, tolerances in the range of ±5 millimeters, in individual cases even ±17 millimeters, are known. As a result, the height of each housing must be individually adapted to the height of the fuel cell stack.

To solve this problem, for example numerous housings having different heights are produced in advance, and an appropriately sized housing is introduced into the production process as soon as the height of the corresponding fuel cell stack is known.

Japanese patent document JP 2009170169 discloses a fuel cell stack situated in a housing having a cover element on its longitudinal sides, and is closed off on an end-face side by an end plate. The cover element and the end plate extend in parallel in sections, and a seal is situated in the section extending in parallel.

Exemplary embodiments of the present invention are directed to a fuel cell stack that is improved over the prior art.

A fuel cell stack is formed from a plurality of stacked fuel cell units and at least one stack end element, the stacked fuel cell units being surrounded by a housing. According to the invention, a frame element is situated on the at least one stack end element and the housing on the end-face side, at least one seal being situated at least between the stack end element and the housing in the area of the frame element.

As described above, the height of the fuel cell stack may vary due to thickness tolerances of the bipolar plates, the membrane electrode units, and/or the seals, for example. Such height differences may advantageously be compensated for by means of the frame element. For this purpose, the frame element encompasses the stack end element and the housing on the end-face side, so that by means of the at least one seal, seal-tightness between the housing and the stack end element is ensured, even for large height tolerances. Thus, housings having standardized heights are preferably usable so that installation may be carried out in a cost- and time-efficient manner.

The frame element is advantageously secured on an end-face side of the stack end element and an end-face side of the housing in a positive-fit, force-fit, and/or integrally joined manner. The frame element is preferably mounted in a positive-fit manner on the end-face side of the stack end element and of the housing, the positive fit being assisted by appropriate adhesive bonding and/or screw connections, thus ensuring a mechanically stable connection between the frame element and the stack end element as well as the housing.

In one possible embodiment, the end-face side of the stack end element is formed by a circumferential angled border of the stack end element, the end-face side of the stack end element extending parallel to the end-face side of the housing and in the stack direction. The flexural and torsional strength of the stack end element are advantageously increased by means of the angled border of the stack end element.

For an optimal positive fit with the end-face side of the stack end element and the housing, in one possible embodiment the frame element has a U-shaped profile, the length of the legs of the U-shaped profile corresponding to the length of the angled end-face side of the stack end element, so that the frame element encompasses the end-face side of the stack end element.

In a first embodiment of the invention, two seals oriented in parallel to one another and having a U-shaped profile in each case are situated between the legs, one of the seals surrounding the end-face side of the stack end element, and the other of the seals surrounding the end-face side of the housing. A positive fit and a seal of the stack end element with respect to the housing are thus advantageously possible. The seals are preferably molded onto the inner surfaces of the frame element, and therefore are easily producible.

It is particularly preferred that the U-shaped profile of one of the seals has a design corresponding to the shape and/or external dimensions of the end-face side of the stack end element, and that the U-shaped profile of the other seal has a design corresponding to the external dimensions of the end-face side of the housing. The seal for accommodating the end-face side of the housing is formed in such a way that this seal is able to accommodate end-face sides of housings having different heights in a predefinable height range.

In a second embodiment of the invention, the surface side of the end-face side of the stack end element facing in the direction of the housing is provided with a seal. The seal is formed from a plurality of lip seals, for example. When the housing is mounted on the fuel cell stack, i.e., when the housing is pushed on in the stack direction, a good sealing effect is thus already achieved. In order to improve a resulting contact pressure, the frame element is situated on the end-face side of the stack end element and of the housing, and thus acts as a clamping frame.

The seal preferably has recesses for accommodating a clamping device, the clamping device being electrically insulated at least in the area of the recesses. The seal, which is designed as a lip seal, for example, and the electrically insulated clamping device advantageously cooperate in a sealing manner, and thus prevent penetration of moisture into the area between the fuel cell stack and the housing. The combination of the clamping device for clamping the fuel cell stack and the seal of the stack end element with respect to the housing also allows simple and cost-effective production of a sealing system for the fuel cell stack, and also saves installation space. For electrically insulating the clamping device, insulation is formed, preferably molded, onto the clamping device by means of an injection molding process, for example.

To optimize the sealing effect of the insulation of the seals, the seals are made of a rubber, a foam, polyvinyl chloride, thermoplastic polyurethane, and/or a thermoplastic polymer. These electrically insulating materials are characterized by high chemical resistance, high heat resistance, and good corrosion properties.

BRIEF DESCRIPTION OF THE DRAWING FIGURES

Figure 2:
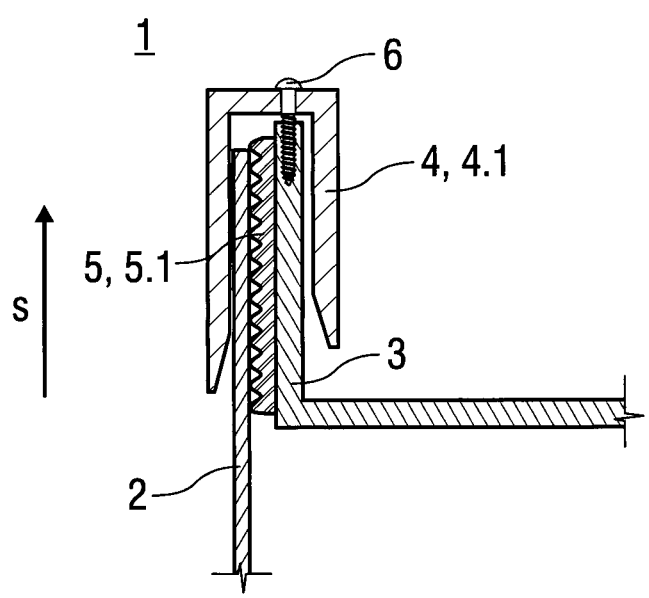

Exemplary embodiments of the invention are explained in greater detail below with reference to the drawings, which show the following:

FIG. 1 schematically shows a sectional illustration of a detail of a fuel cell stack according to the invention in a first exemplary embodiment, and FIG. 2 schematically shows a sectional illustration of a detail of a fuel cell stack according to the invention in a second exemplary embodiment.

Mutually corresponding parts are provided with the same reference numerals in all the figures.

DETAILED DESCRIPTION

FIG. 1 shows a detail of a fuel cell stack 1 according to the invention in a first exemplary embodiment, the fuel cell stack 1 including a housing 2, a stack end element 3, and a frame element 4.

The fuel cell stack 1 is composed of the plurality of stacked fuel cell units, not illustrated in greater detail, which are situated in the housing 2 and which are designed, for example, as high-temperature fuel cell units, such as solid oxide fuel cells, or also low-temperature fuel cell units, such as polymer electrolyte fuel cells, whereby polymer electrolyte fuel cells (PEMFC) are preferred.

The housing 2 is designed, for example, as a housing 2, which is open at one end and which surrounds the stacked fuel cell units. Ideally, the housing 2 at its open end is adjoined by an end or a surface side of the stack end element 3, which delimits the fuel cell stack 1 on the end-face side.

Since the height of the fuel cell stack 1 typically varies due to thickness tolerances of bipolar plates, membrane electrode units, and/or seals 5 situated in the fuel cell unit, the housing 2 may encompass a portion of a surface side of an end-face side of the stack end element 3, as illustrated by way of example in FIGS. 1 and 2.

In the present exemplary embodiment, the end-face side of the stack end element 3 is formed by a circumferential angled border of the stack end element 3, the end-face side of the stack end element 3 extending parallel to the end-face side of the housing 2 and in the stack direction s.

The stack end element 3 delimits the fuel cell stack 1 on the end-face side in the form of an upper end plate. Alternatively, the housing 2 may be designed as a housing 2 which is open on both sides, the fuel cell stack 1 having two stack end elements 3, so that one of the stack end elements 3 delimits an upper end-face side of the fuel cell stack 1, and the other of the stack end elements 3 delimits a lower end face of the fuel cell stack 1 in the form of a lower end plate (not illustrated). It is particularly preferred that the upper end plate forms the cover, and the lower end plate forms the base, of the housing 2.

The stack end element 3 is particularly preferably manufactured in one piece as a metal-plastic hybrid component in the plastic injection molding process. The design of the stack end element 3 as a metal-plastic hybrid component allows the beneficial properties of two different materials to be combined. By means of the metal part, clamping forces may be introduced into the fuel cell units over a large surface area, and connecting points to support structures, such as the vehicle body, may be implemented. In addition, the dimensional stability and heat stability of the metal part are very good. A metallic alloy such as steel is also suitable as a metal material.

Electrical insulation of the fuel cell stack 1 with respect to the surroundings is achievable by means of a reinforcing part molded onto the metal part. In addition, an interface to the housing 2 of the fuel cell stack 1, discharge/supply of gaseous or liquid media from/to the fuel cell stack 1, and insulation of media, electrically as well as for protection from corrosion, are achievable by means of the reinforcing part. The reinforcing part thus optimizes the metal part. In particular a thermoplastic material is suited as a plastic or an organic polymer.

To seal the stack end element 3, whose end-face side as illustrated in the present exemplary embodiment is surrounded by the end-face side of the housing 2, with respect to the housing 2, the fuel cell stack 1 has the frame element 4, which is secured on the end-face side of the stack end element 3 and the end-face side of the housing 2 in a positive-fit, force-fit, and/or integrally joined manner.

The frame element 4 has a U-shaped profile, whereby two seals 5 oriented in parallel to one another and having a U-shaped profile in each case are situated between the legs.

One of the seals 5 surrounds the end-face side of the stack end element 3, and the other of the seals 5 surrounds the end-face side of the housing 2. The length of the legs of the U-shaped profile of the seal 5, which encompasses the end-face side of the stack end element 3, corresponds to the length of the angled end-face side of the stack end element 3.

The length of the legs of the U-shaped profile of the seal 5, which encompasses the end-face side of the housing 2, is predefinable, so that the seal may accommodate end-face sides of housings 2 having different heights in a given height range. The end-face side of a housing 2, whose height lies in a minimum range of the given height range, does not contact the web of the leg of the U-shaped profile of the seal 5, and the end-face side of a housing 2, whose height lies in a maximum range of the given height range, may contact the web of the leg of the U-shaped profile of the seal 5, a sufficient overlap between the seals 5 and the housing 2 being ensured.

A positive fit and a seal of the stack end element 3 with respect to the housing 2 may thus be advantageously ensured, even for large height tolerances. Thus, housings 2 having standardized heights are preferably usable so that installation of the fuel cell stack 1 may be carried out in a cost- and time-efficient manner. In addition, a reduction in the weight of the fuel cell stack 1 is possible, thus profitably allowing a reduction in the weight of a vehicle that is operated using fuel cells, and thus, energy savings during operation of the vehicle.

The seals 5 are molded onto the inner surfaces of the frame element 4, for example, and therefore are easily producible. Alternatively, the seals 5 are inserted between the legs of the frame element 4 and additionally adhesively bonded. For an optimal sealing effect, the seals are made of a rubber, a foam, polyvinyl chloride, thermoplastic polyurethane, and/or a thermoplastic polymer. These electrically insulating materials are characterized by high chemical resistance, high heat resistance, and good corrosion properties.

The frame element 4 is preferably made of a plastic, such as an organic polymer, and during installation of the fuel cell stack 1 is advantageously mounted in a positive-fit manner on the end-face side of the stack end element 3 and of the housing 2, this positive fit being assisted by a force-fit and/or integral joining in such a way that a mechanically stable connection is ensured between the frame element 4 and the stack end element 3 as well as the housing 2. In the present exemplary embodiment, for this purpose the frame element 4 is screwed to the stack end element 3 in a force-fit manner by means of a screw 6. Alternatively, the frame element 4 and/or the seals 5 may be adhesively bonded to the end-face side of the stack end element 3 and/or to the end-face side of the housing 2.

A second, alternative embodiment of the invention is shown in FIG. 2, in which the surface side of the end-face side of the stack end element 3 facing in the direction of the housing 2 is provided with a seal 5.

In the present exemplary embodiment, the seal 5 is formed from a plurality of circumferential lip seals 5.1 which, for example, are molded onto the surface side of the end-face side of the stack end element 3. Alternatively, the lip seals 5.1 may be adhesively bonded to the stack end element 3. In another alternative embodiment, the seal 5 is designed as a plurality of ring seals, or as a one-piece circumferential seal.

The lip seals 5.1 are preferably made of the same material as the seals 5 according to the first exemplary embodiment of the invention.

The lip seals 5.1 preferably have recesses for accommodating a clamping device (not shown), the clamping device being electrically insulated at least in the area of the recesses. In the installed state of the fuel cell stack 1, the stack end elements 3 and the housing 2 are clamped together by means of the clamping device, since the clamping device transmits tensile forces for clamping the fuel cell stack 1, via the fuel cell stack, to the fuel cell units stacked in the housing 2 and to the stack end element 3.

The lip seals 5.1 and the electrically insulated clamping device advantageously cooperate in a sealing manner, and thus prevent penetration of moisture into the area between the fuel cell stack 1 and the housing 2. The combination of the clamping device for clamping the fuel cell stack 1 and the seal of the stack end element 3 with respect to the housing 2 also allows simple and cost-effective production of a sealing system for the fuel cell stack 1, and also saves installation space. For electrically insulating the clamping device, insulation is formed, preferably molded, onto the clamping device by means of an injection molding process, for example.

When the housing 2 is mounted on the fuel cell stack 1, i.e., when the housing 2 is pushed on in the stack direction s, an appropriate sealing effect is achieved when the surface side of the end-face side of the housing 2 facing the stack end element 3 slides along the seal 5 until the housing 2 reaches an end position. In order to improve a resulting contact pressure, the frame element 4 is situated on the end-face side of the stack end element 3 and of the housing 2 in a virtually positive-fit manner, and thus advantageously acts as a clamping frame 4.1. The frame element 4, designed as a clamping frame 4.1, may have a one-piece or multi-piece design.

In the present exemplary embodiment, the clamping frame 4.1 is screwed to the stack end element 3 in a force-fit manner by means of a screw 6. Alternatively, for this purpose the clamping frame 4.1 may be adhesively bonded to the stack end element 3 and/or to the housing 2. In another alternative, it is also possible to provide the inner sides of the clamping frame 4.1 with corresponding contact profiles by means of which the clamping frame 4.1 is held in position.

To ensure optimal installation of the clamping frame 4.1 with regard to time and effort, the legs of the clamping frame have insertion chamfers at their free ends.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

1 Fuel cell stack
2 Housing
3 Stack end element
4 Frame element
4.1 Clamping frame
5 Seal
5.1 Lip seals
Screw
s Stack direction

The invention claimed is:

1. A fuel cell stack, comprising:
 a plurality of stacked fuel cell units;
 at least one stack end element;
 a housing, which surrounds the plurality of stacked fuel cell units;
 a frame element arranged on the at least one stack end element and on an end-face side of the housing; and
 at least one seal arranged at least between the at least one stack end element and the housing in an area of the frame element.

2. The fuel cell stack of claim 1, wherein the frame element is secured on an end-face side of the at least one stack end element and the end-face side of the housing in a positive-fit, force-fit, or integrally joined manner.

3. The fuel cell stack of claim 2, wherein the end-face side of the at least one stack end element is formed by a circumferential angled border of the at least one stack end element, the end-face side of the at least one stack end element extending parallel to the end-face side of the housing in the stack direction.

4. The fuel cell stack of claim 3, wherein the frame element has a U-shaped profile.

5. The fuel cell stack of claim 4, wherein the U-shaped profile has a base and two legs, wherein a length of the two legs of the U-shaped profile corresponds to a length of the angled end-face side of the at least one stack end element.

6. The fuel cell stack of claim 5, further comprising:
 first and second seals, which are oriented in parallel to one another and each having a U-shaped profile, are arranged between the two legs, wherein the first seal surrounds the end-face side of the at least one stack end element, and the second seal surrounds the end-face side of the housing.

7. The fuel cell stack of claim 6, wherein the U-shaped profiles of the seals are configured to correspond to a shape or external dimensions of the end-face side of the at least one stack end element and of the housing.

8. The fuel cell stack of claim 2, wherein a surface side of the end-face side of the at least one stack end element facing in a direction of the housing includes a seal comprised of a plurality of lip seals.

9. The fuel cell stack of claim 8, further comprising:
 a clamping device, wherein the seal has recesses configured to accommodate the clamping device, and the clamping device is electrically insulated at least in an area of the recesses.

10. The fuel cell stack of claim 1, wherein the seals are made of a rubber, a foam, polyvinyl chloride, thermoplastic polyurethane, or a thermoplastic polymer.

\* \* \* \* \*